US010336053B2

(12) United States Patent
Sasaki

(10) Patent No.: US 10,336,053 B2
(45) Date of Patent: Jul. 2, 2019

(54) CONTROL APPARATUS FOR THREE DIMENSIONAL OBJECT FABRICATION APPARATUS, CONTROL METHOD FOR THREE-DIMENSIONAL OBJECT FABRICATION APPARATUS, AND THREE-DIMENSIONAL OBJECT FABRICATION SYSTEM

(71) Applicant: Takafumi Sasaki, Kanagawa (JP)

(72) Inventor: Takafumi Sasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 294 days.

(21) Appl. No.: 15/276,881

(22) Filed: Sep. 27, 2016

(65) Prior Publication Data

US 2017/0095979 A1 Apr. 6, 2017

(30) Foreign Application Priority Data

Oct. 1, 2015 (JP) .................................. 2015-196040
Aug. 5, 2016 (JP) .................................. 2016-155016

(51) Int. Cl.
*B29C 67/00* (2017.01)
*B33Y 50/02* (2015.01)
(Continued)

(52) U.S. Cl.
CPC ............ *B33Y 50/02* (2014.12); *B29C 64/165* (2017.08); *B29C 64/386* (2017.08); *B33Y 30/00* (2014.12);
(Continued)

(58) Field of Classification Search
CPC ... B29C 64/165; B29C 64/386; B29C 64/393; B33Y 30/00; B33Y 50/02
(Continued)

(56) References Cited

U.S. PATENT DOCUMENTS

| 2002/0093115 A1 | 7/2002 | Jang et al. |
| 2009/0025638 A1* | 1/2009 | Inoue ....................... A61C 7/12 118/712 |

(Continued)

FOREIGN PATENT DOCUMENTS

| JP | 2013-075392 | 4/2013 |
| JP | 5471939 | 2/2014 |
| JP | 2015-112752 | 6/2015 |

OTHER PUBLICATIONS

Jacobs, "The Effects of Random Noise Shrinkage on Rapid Tooling Accuracy", Materials & Design vol. 21, pp. 127-136 (Year: 2000).*
(Continued)

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

A control apparatus controls a three-dimensional object fabrication apparatus including a storing unit configured to store therein powder, a supplying unit configured to supply the powder to the storing unit in layers, and a discharge unit configured to discharge, onto the powder, a fabrication liquid for solidifying the powder. The control apparatus includes a controller configured to control a total amount of the powder supplied from the supplying unit to the storing unit based on fabrication data indicating a shape of a three-dimensional object and powder information indicating a change in dimension of a layer of the powder due to permeation of the fabrication liquid.

18 Claims, 15 Drawing Sheets

(51) Int. Cl.
  *B33Y 30/00* (2015.01)
  *B29C 64/165* (2017.01)
  *B29C 64/386* (2017.01)
  *B29K 105/00* (2006.01)
  *B29C 64/393* (2017.01)
(52) U.S. Cl.
  CPC .... *B29C 64/393* (2017.08); *B29K 2105/0058* (2013.01); *B29K 2105/251* (2013.01)
(58) Field of Classification Search
  USPC ..... 425/174.4, 375, 141; 264/308, 128, 112, 264/113
  See application file for complete search history.

(56)           References Cited

U.S. PATENT DOCUMENTS

| 2010/0161102 | A1 | 6/2010 | Mattes et al. |
| 2015/0158249 | A1 | 6/2015 | Goto |
| 2015/0165680 | A1 | 6/2015 | Goto |
| 2015/0224709 | A1 | 8/2015 | Napadensky |
| 2015/0343533 | A1 | 12/2015 | Park et al. |
| 2016/0067929 | A1 | 3/2016 | Park |
| 2016/0075084 | A1 | 3/2016 | Sakura |
| 2016/0075085 | A1 | 3/2016 | Sasaki |
| 2016/0214320 | A1 | 7/2016 | Sasaki et al. |
| 2016/0236422 | A1 | 8/2016 | Sakura |
| 2016/0243765 | A1 | 8/2016 | Sasaki et al. |
| 2016/0243805 | A1 | 8/2016 | Satoh |

OTHER PUBLICATIONS

U.S. Appl. No. 15/186,731, filed Jun. 20, 2016.
U.S. Appl. No. 15/183,141, filed Jun. 15, 2016.
Extended European Search Report dated Jul. 12, 2017.

\* cited by examiner

| | |
|---|---|
| m (TOTAL NUMBER OF LAMINATES) | 10 |
| t (ONE-LAYER THICKNESS IN DESIGN) μm | 100 |
| DESIGN VALUE=mt μm | 1000 |
| ti (THICKNESS AFTER FABRICATION LIQUID IS DISCHARGED) μm | 66.6 |
| k=ti/t | 0.666 |

| n | tn | SECOND TERM OF tr |
|---|---|---|
| 1 | 67 | 599 |
| 2 | 89 | 711 |
| 3 | 96 | 674 |
| 4 | 99 | 593 |
| 5 | 100 | 498 |
| 6 | 100 | 399 |
| 7 | 100 | 300 |
| 8 | 100 | 200 |
| 9 | 100 | 100 |
| 10 | 100 | 0 |

| FIRST TERM OF tr | SUM OF SECOND TERM OF tr | tr (μm) | DIFFERENCE FROM DESIGN THICKNESS (μm) |
|---|---|---|---|
| 5500 | 4074 | 950 | 50 |

| | |
|---|---|
| m (TOTAL NUMBER OF LAMINATES) | 15 |
| t (ONE-LAYER THICKNESS IN DESIGN) μm | 100 |
| DESIGN VALUE=mt | 1500 |
| ti (THICKNESS AFTER FABRICATION LIQUID IS DISCHARGED) μm | 35.7 |
| k=ti/t | 0.357 |

| n | tn | SECOND TERM OF tr |
|---|----|-------------------|
| 1 | 36 | 500 |
| 2 | 59 | 763 |
| 3 | 73 | 881 |
| 4 | 83 | 912 |
| 5 | 89 | 890 |
| 6 | 93 | 837 |
| 7 | 95 | 764 |
| 8 | 97 | 680 |
| 9 | 98 | 589 |
| 10 | 99 | 494 |
| 11 | 99 | 397 |
| 12 | 100 | 299 |
| 13 | 100 | 199 |
| 14 | 100 | 100 |
| 15 | 100 | 0 |

| FIRST TERM OF tr | SUM OF SECOND TERM OF tr | tr | DIFFERENCE FROM DESIGN THICKNESS |
|---|---|---|---|
| 12000 | 8304 | 1320 | 180 |

CONTROL APPARATUS FOR THREE DIMENSIONAL OBJECT FABRICATION APPARATUS, CONTROL METHOD FOR THREE-DIMENSIONAL OBJECT FABRICATION APPARATUS, AND THREE-DIMENSIONAL OBJECT FABRICATION SYSTEM

CROSS-REFERENCE TO RELATED APPLICATIONS

The present application claims priority under 35 U.S.C. § 119 to Japanese Patent Application No. 2016-155016, filed Aug. 5, 2016 and Japanese Patent Application No. 2015-196040, filed Oct. 1, 2015. The contents of which are incorporated herein by reference in their entirety.

BACKGROUND OF THE INVENTION

1. Field of the Invention

The present invention relates to a control apparatus for a three-dimensional object fabrication apparatus, a control method for a three-dimensional object fabrication apparatus, and a three-dimensional object fabrication system.

2. Description of the Related Art

Methods for manufacturing a three-dimensional object have been known such as powder additive manufacturing methods with binder-jetting. The manufacturing methods repeat a process of forming a powder layer by supplying a certain amount of material powder in a container and a process of solidifying a certain portion of the powder by discharging a fabrication liquid that solidifies powder onto the powder, thereby manufacturing a desired three-dimensional object in the container.

For example, an apparatus has been disclosed that forms a base layer of an overhang part at the (k+1)th layer in the process of binding the kth layer in order to prevent permeation of a binding liquid (fabrication liquid) to a lower layer when the overhang part is formed (Japanese Patent No. 5471939).

In a powder additive manufacturing method with binder-jetting, when a fabrication liquid permeates powder, the density of the powder increases due to liquid bridging force of the fabrication liquid and the thickness of a layer of the powder is reduced. Thus, an error may occur in the thickness (the length in a laminating direction) of a desired three-dimensional object.

Therefore, there is a need to improve the precision of fabricating a three-dimensional object.

SUMMARY OF THE INVENTION

According to one aspect of the present invention,

BRIEF DESCRIPTION OF THE DRAWINGS

FIG. 18 is a diagram illustrating exemplary powder information when stainless steel is used as the powder in the three-dimensional object fabrication system according to the embodiment;

FIG. 20 is a diagram illustrating exemplary powder information when zirconia is used as the powder in the three-dimensional object fabrication system according to the embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
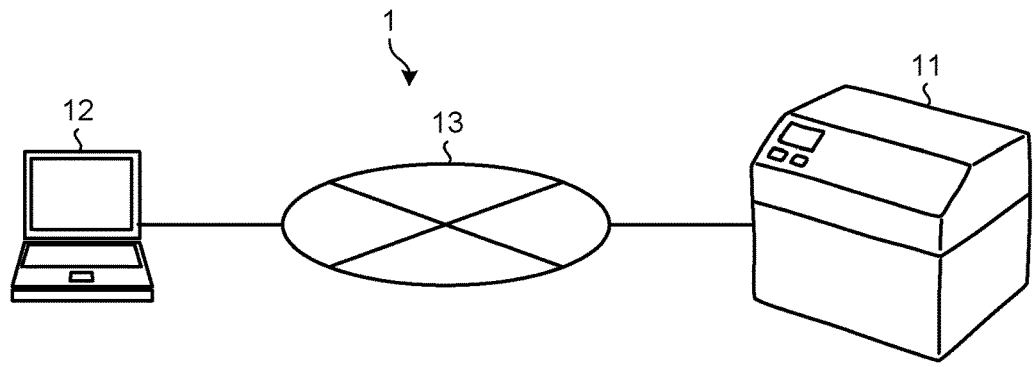
FIG. 1 is a diagram illustrating an exemplary hardware configuration of a three-dimensional object fabrication system according to an embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

FIG. 1 is a diagram illustrating an exemplary hardware configuration of a three-dimensional object fabrication system 1 according to an embodiment. The three-dimensional object fabrication system 1 includes a three-dimensional object fabrication apparatus (hereinafter referred to as an object fabrication apparatus) 11, an information processing terminal 12, and a network 13.

The object fabrication apparatus 11 is an apparatus that forms a three-dimensional object of any shape by a powder additive manufacturing method with binder-jetting. The powder additive manufacturing method with binder-jetting repeats a process of forming a powder layer by supplying a certain amount of material powder in a container and a process of solidifying a certain portion of the powder by discharging a fabrication liquid that solidifies powder onto the powder, thus manufacturing a desired three-dimensional object in the container.

The information processing terminal 12 is a device that generates a control signal for controlling the object fabrication apparatus 11. The information processing terminal 12 may be a general computer, tablet, or smartphone. The information processing terminal 12, however, is not limited thereto.

The network 13 is a known or new computer network that enables transmission and reception of signals between the object fabrication apparatus 11 and the information processing terminal 12.

FIG. 1 illustrates an example in which one object fabrication apparatus 11 and one information processing terminal 12 are connected via the network 13; however, a plurality of object fabrication apparatuses 11 and information processing terminals 12 may be provided.

Figure 2:
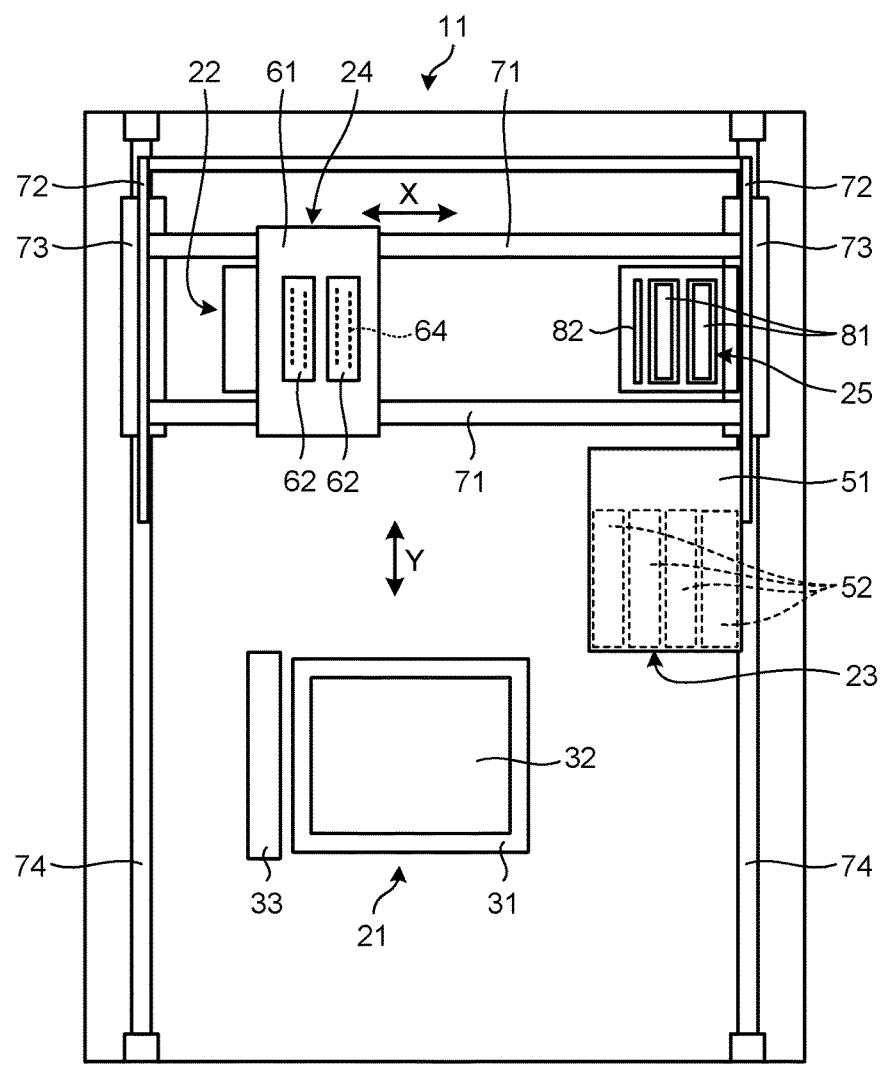
FIG. 2 is a top view illustrating an exemplary hardware configuration of an object fabrication apparatus according to a first example of the embodiment.
Figure 3:
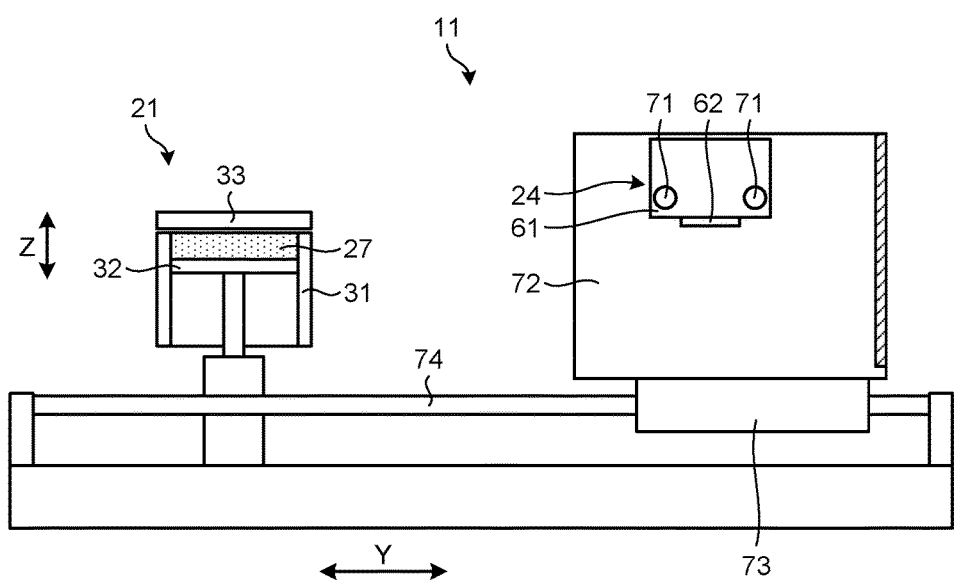
FIG. 3 is a side view illustrating an exemplary part of the hardware configuration of the object fabrication apparatus according to the first example of the embodiment.
Figure 4:
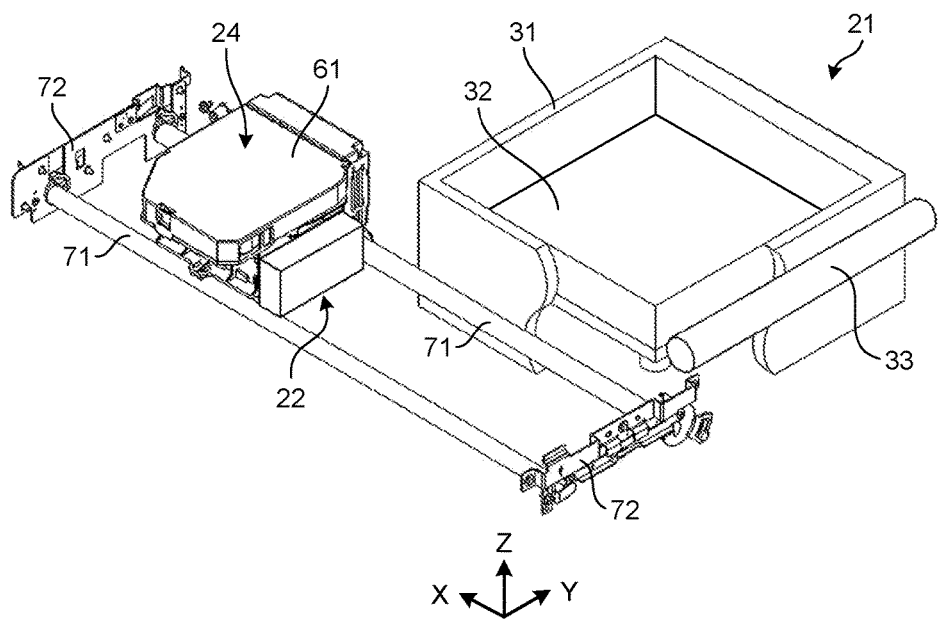
FIG. 4 is a perspective view illustrating an exemplary part of the hardware configuration of the object fabrication apparatus according to the first example of the embodiment.
Figure 5:
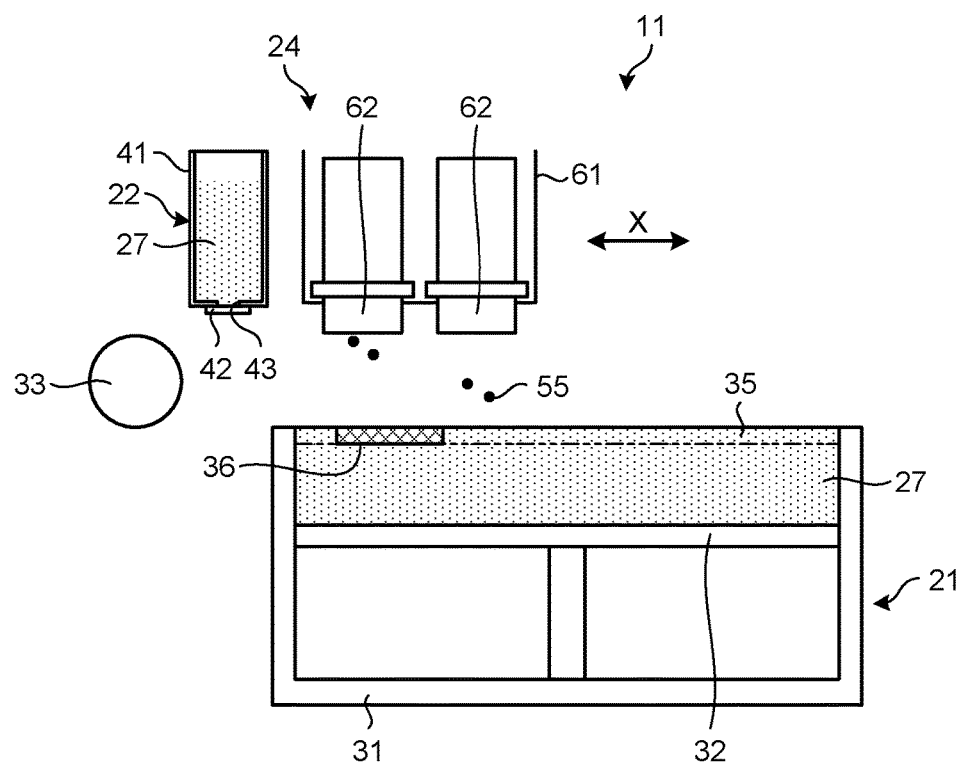
FIG. 5 is a diagram illustrating an exemplary operating state of the object fabrication apparatus according to the first example of the embodiment.

FIG. 2 is a top view illustrating an exemplary hardware configuration of the object fabrication apparatus 11 according to a first example of the embodiment. FIG. 3 is a side view illustrating an exemplary part of the hardware configuration of the object fabrication apparatus 11 according to the first example of the embodiment. FIG. 4 is a perspective view illustrating an exemplary part of the hardware configuration of the object fabrication apparatus 11 according to the first example of the embodiment. FIG. 5 is a diagram illustrating an exemplary operating state of the object fabrication apparatus 11 according to the first example of the embodiment.

The object fabrication apparatus 11 includes a storing unit 21, a supplying unit 22, a fabrication liquid reservoir unit 23, a discharge unit 24, and a maintenance unit 25.

The storing unit 21 is a unit that stores therein powder 27 for forming a three-dimensional object and includes a fabrication vessel 31, a fabrication stage 32, and a roller 33.

The fabrication vessel 31 is a member that stores therein the powder 27 supplied from the supplying unit 22 (to be described late). A three-dimensional object is formed in the fabrication vessel 31.

The fabrication stage 32 is a member that is placed on the bottom of the fabrication vessel 31 and displaces in the Z direction. Moving up and down the fabrication stage 32 changes the volume of the fabrication vessel 31. The fabrication stage 32 moves down as the number of layers of the powder 27 increases.

The roller 33 is a member that flattens a surface of the powder 27 supplied from the supplying unit 22 into the fabrication vessel 31. The roller 33 displaces in the X direction while rotating.

The supplying unit 22 is a unit that supplies the powder 27 to the storing unit 21 (the fabrication vessel 31) and includes a container 41 and a shutter 42.

The container 41 is a container that contains the powder 27. The container 41 has an opening 43 at its lower end. The container 41 is fixed to a carriage 61 of the discharge unit 24 (to be described later) and displaces along with the carriage 61.

The shutter 42 is a member that opens and closes the opening 43 of the container 41. The amount of the powder 27 supplied to the fabrication vessel 31 is adjusted according to a period of time during which the shutter 42 opens.

The fabrication liquid reservoir unit 23 is a unit that stores therein a fabrication liquid 55 for solidifying the powder 27 and includes a tank mounting member 51 and tanks 52.

The tank mounting member 51 is a member that removably fixes the tanks 52.

The tanks 52 are members that each store therein the fabrication liquid 55. In this example, a plurality of tanks 52 are provided. Each of the tanks 52 may store therein a different fabrication liquid 55. Examples of the fabrication liquid may include liquids containing: hydrophilic solvents mainly composed of water and containing components such as alcohols, ethers, and ketones; aliphatic hydrocarbons; ether-based solvents such as glycol ethers; ester-based solvents such as ethyl acetate; ketone-based solvents such as methyl ethyl ketone; or higher alcohols. The fabrication liquid, however, is not limited to the above examples. The inside of the tanks 52 connects to discharge heads 62 in the discharge unit 24 (to be described later) via a channel (not illustrated).

The discharge unit 24 is a unit that discharges the fabrication liquid 55 onto the powder 27 in the storing unit 21 (the fabrication vessel 31) and includes the carriage 61 and the discharge heads 62.

The carriage 61 is a member that fixes the supplying unit 22 and the discharge heads 62. The carriage 61 is connected to first rails 71 disposed parallel to the X direction, and displaces along the first rails 71 (in the X direction). Both ends of each first rail 71 are fixed to respective side plates 72. The side plates 72 are fixed to respective sliders 73. The sliders 73 are connected to respective second rails 74 disposed parallel to the Y direction, and displace along the second rails 74 (in the Y direction). The second rails 74 displace in the Z direction. With the above structure, the carriage 61 can move three-dimensionally. Along with movement of the carriage 61, the supplying unit 22 and the discharge heads 62 fixed to the carriage 61 move. Controlling the movements of the carriage 61 and the supplying unit 22 enables control of the total amount of the powder 27 supplied from the supplying unit 22 to the storing unit 21.

The discharge heads 62 are members that discharge the fabrication liquid 55 stored in the tanks 52 toward the powder 27 in the fabrication vessel 31. The discharge heads 62 each include a plurality of nozzles 64 facing downward. The discharge heads 62 connect to the tanks 52 via the channel (not illustrated). Two discharge heads 62 are provided in this example. Each of the discharge heads 62 may discharge a different fabrication liquid 55.

The maintenance unit 25 is a unit that performs maintenance of the discharge unit 24 and includes caps 81 and a wiper 82.

The caps 81 are brought into close contact with the surfaces of the respective discharge heads 62 where the nozzles 64 are formed, so that the fabrication liquid 55 is suctioned from the nozzles 64. This configuration can remove the powder 27 clogged in the nozzles 64 and the fabrication liquid 55 being highly concentrated. In addition, entrance of the powder 27 into the nozzles 64 and drying of the fabrication liquid 55 can be prevented by covering the nozzles 64 with the caps 81 while the fabrication liquid 55 is not discharged.

The wiper 82 is a member that wipes the surfaces of the discharge heads 62 where the nozzles 64 are formed.

The storing unit 21, the supplying unit 22, the fabrication liquid reservoir unit 23, the discharge unit 24, and the maintenance unit 25 described above are controlled on the basis of control signals from the information processing terminal 12. For example, based on the control signals, control is performed on supply of the powder 27 to the fabrication vessel 31, movement of the carriage 61, discharge of the fabrication liquid 55, selection of a type of the fabrication liquid 55 to be discharged, performance of maintenance, and other operations. By operating the object fabrication apparatus 11, as illustrated in FIG. 5, a layer 35 of the powder 27 is formed in an upper layer portion of the fabrication vessel 31. The fabrication liquid 55 is discharged onto the layer 35 to form a fabricated layer 36 in which the powder 27 is solidified. Fabricated layers 36 of respective layers 35 are laminated to form a desired three-dimensional object.

Figure 6:
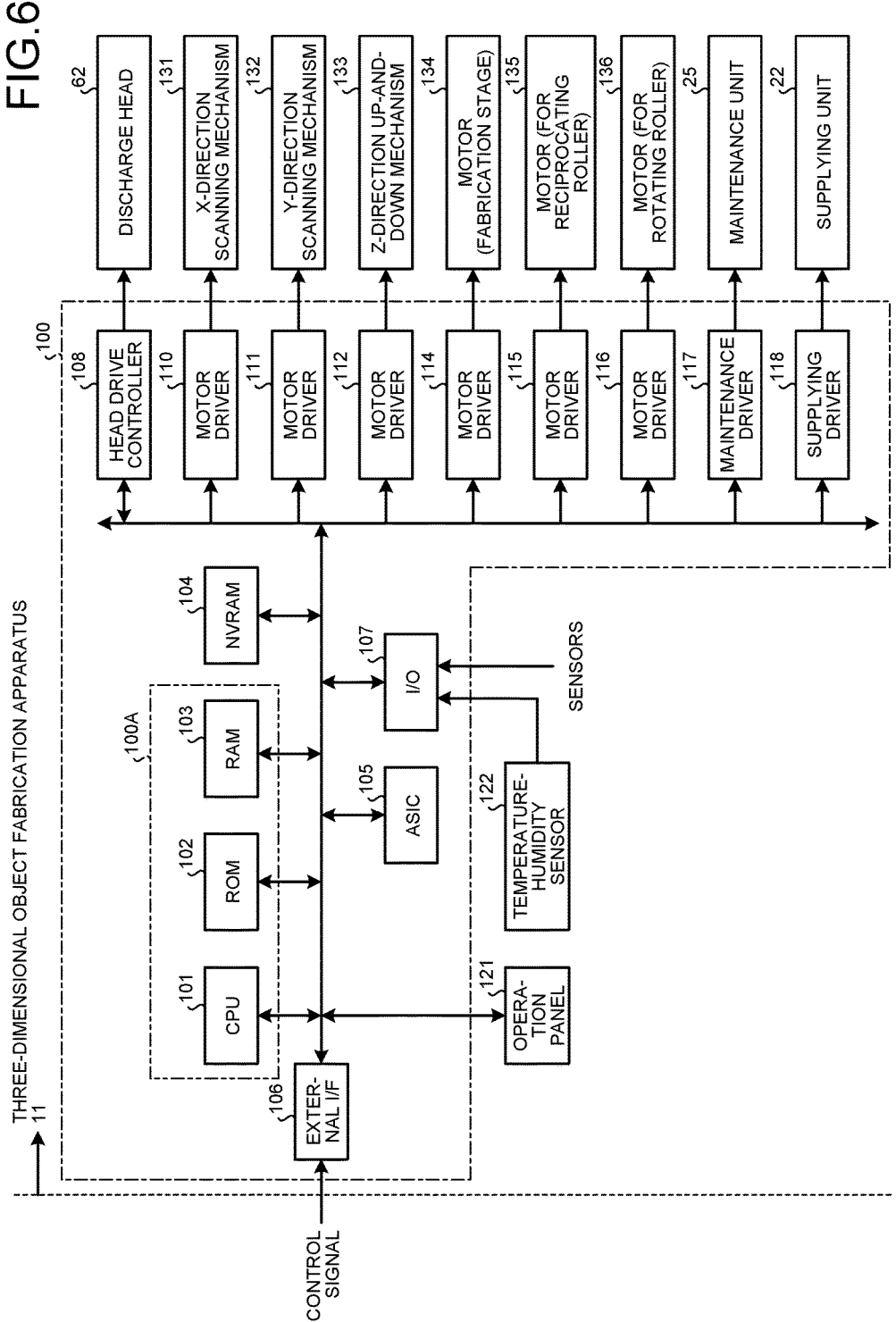
FIG. 6 is a diagram illustrating an exemplary internal hardware configuration of the object fabrication apparatus according to the first example of the embodiment.

FIG. 6 is a diagram illustrating an exemplary internal hardware configuration of the object fabrication apparatus 11 according to the first example of the embodiment.

A controller 100 of the object fabrication apparatus 11 includes a main controller 100A. The main controller 100A includes a central processing unit (CPU) 101 that controls the entire object fabrication apparatus 11, a read only memory (ROM) 102 that stores therein a program for controlling the CPU 101 and other fixed data, and a random access memory (RAM) 103 that temporarily stores therein control signals and other data.

The controller 100 includes a non-volatile memory (non volatile RAM: NVRAM) 104, an application specific integrated circuit (ASIC) 105, an external interface (I/F) 106, and an input/output (I/O) 107. The NVRAM 104 is a memory for retaining data while the apparatus is powered off. The ASIC 105 performs image processing on three-dimensional fabrication data and other processing on input and output signals for controlling the entire apparatus. The external I/F 106 receives control signals output from the information processing terminal 12. The I/O 107 acquires detection signals from various sensors such as a temperature-humidity sensor 122.

The controller 100 includes a head drive controller 108 that controls driving of the discharge heads 62. The controller 100 includes motor drivers 110, 111, and 112. The motor driver 110 drives an X-direction scanning mechanism 131 that moves the carriage 61 in the X direction. The motor driver 111 drives a Y-direction scanning mechanism 132 that moves the carriage 61 in the Y direction. The motor driver 112 drives a Z-direction up-and-down mechanism 133 that moves the carriage 61 in the Z direction.

The controller 100 includes motor drivers 114, 115, and 116. The motor driver 114 drives a motor 134 that moves the fabrication stage 32 up and down. The motor driver 115 drives a motor 135 that reciprocates the roller 33 along the X direction. The motor driver 116 drives a motor 136 that rotates the roller 33.

The controller 100 includes a maintenance driver 117 that drives the maintenance unit 25.

The controller 100 includes a supplying driver 118 that drives the supplying unit 22 (the shutter 42).

The I/O 107 receives input of detection signals from the temperature-humidity sensor 122 that detects temperature and humidity as environmental conditions. An operation panel 121 is connected to the controller 100, which is used for inputting and displaying information needed for the object fabrication apparatus 11.

Figure 7:
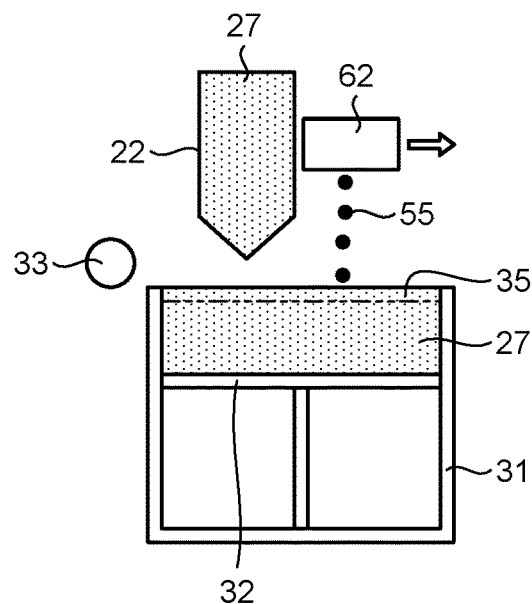
FIG. 7 is a diagram illustrating an exemplary state in which a fabrication liquid is discharged onto a powder layer in the object fabrication apparatus according to the first example of the embodiment.

FIG. 7 to FIG. 10 illustrate processes for forming a three-dimensional object. FIG. 7 is a diagram illustrating an exemplary state in which the fabrication liquid 55 is discharged onto the layer 35 of the powder 27 in the object fabrication apparatus 11 according to the first example of the embodiment.

Figure 8:
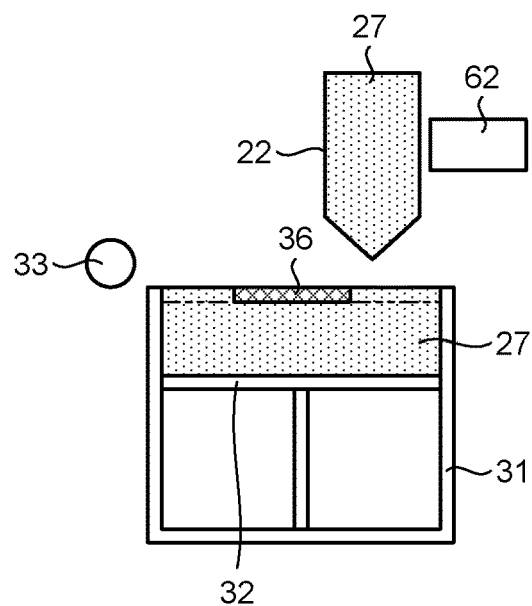
FIG. 8 is a diagram illustrating an exemplary state in which a fabricated layer has been formed in the object fabrication apparatus according to the first example of the embodiment.

FIG. 8 is a diagram illustrating an exemplary state in which the fabricated layer 36 has been formed in the object fabrication apparatus 11 according to the first example of the embodiment. FIG. 8 illustrates a state in which the portion on which the fabrication liquid 55 was discharged has been solidified to form the fabricated layer 36.

Figure 9:
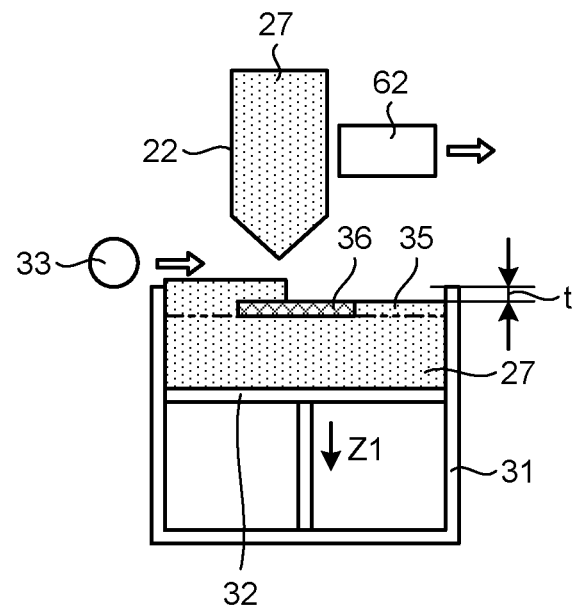
FIG. 9 is a diagram illustrating an exemplary state in which new powder is supplied onto the layer containing the fabricated layer in the object fabrication apparatus according to the first example of the embodiment.

FIG. 9 is a diagram illustrating an exemplary state in which new powder 27 is supplied onto the layer 35 containing the fabricated layer 36 in the object fabrication apparatus 11 according to the first example of the embodiment. FIG. 9 illustrates a state in which the powder 27 in the supplying unit 22 is supplied into the fabrication vessel 31. At this time, the fabrication stage 32 moves down in the direction of arrow Z1 so that the length from the upper surface of the layer 35 containing the fabricated layer 36 to the upper end of the fabrication vessel 31 is t. t is a thickness of one layer 35. The supplying unit 22 then moves to the right in FIG. 9 while dropping the powder 27. The roller 33 moves to the right in FIG. 9 on the upper surface of the fabrication vessel 31 while rotating to flatten the upper surface of the powder 27.

Figure 10:
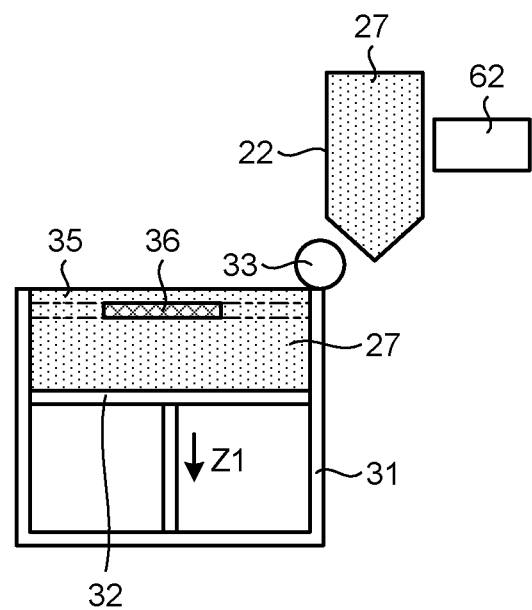
FIG. 10 is a diagram illustrating an exemplary state in which a new layer has been recoated in the object fabrication apparatus according to the first example of the embodiment.

FIG. 10 is a diagram illustrating an exemplary state in which a new layer 35 has been recoated in the object fabrication apparatus 11 according to the first example of the embodiment. FIG. 10 illustrates a state in which the roller 33 has moved to the right end in FIG. 10 on the upper surface of the fabrication vessel 31 to recoat the new layer 35 on the layer containing the fabricated layer 36.

Figure 11:
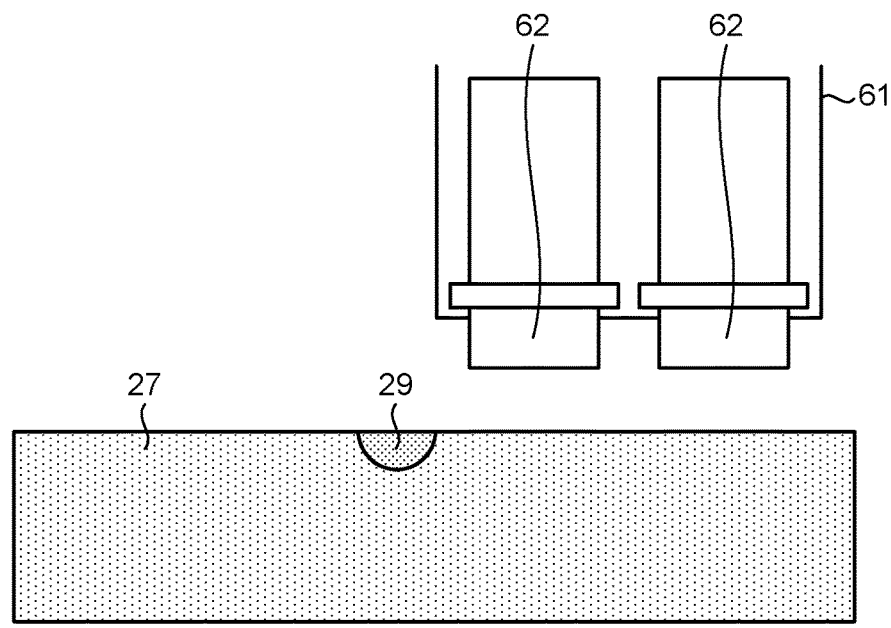
FIG. 11 is a diagram illustrating an exemplary state of the powder on which the fabrication liquid has been discharged in the object fabrication apparatus according to the first example of the embodiment.

FIG. 11 is a diagram illustrating an exemplary state of the powder 27 on which the fabrication liquid 55 has been discharged in the object fabrication apparatus 11 according to the first example of the embodiment. This example illustrates a permeation state in which two-dimensional image data has been generated with a pitch of 300×300 dpi (approximately 85 μm) and, based on the data, a droplet 29 of the fabrication liquid 55 has been discharged and landed on the powder 27. The quantity of one droplet 29 is preferably such a quantity that the droplet 29 is just permeable for a thickness t (100 μm, for example) of one layer 35. This quantity of droplet can be experimentally determined. For example, the powder 27 is spread on a glass substrate to a thickness of 100 μm, and the droplet 29 is dropped on the powder 27. By observing, with a camera, a surface opposite to the surface on which the droplet is dropped, whether the droplet 29 has permeated the thickness of 100 μm can be determined. By repeating this experiment while varying the quantity of the droplet, the quantity of the droplet just permeable for the thickness of 100 μm can be determined.

Figure 12:
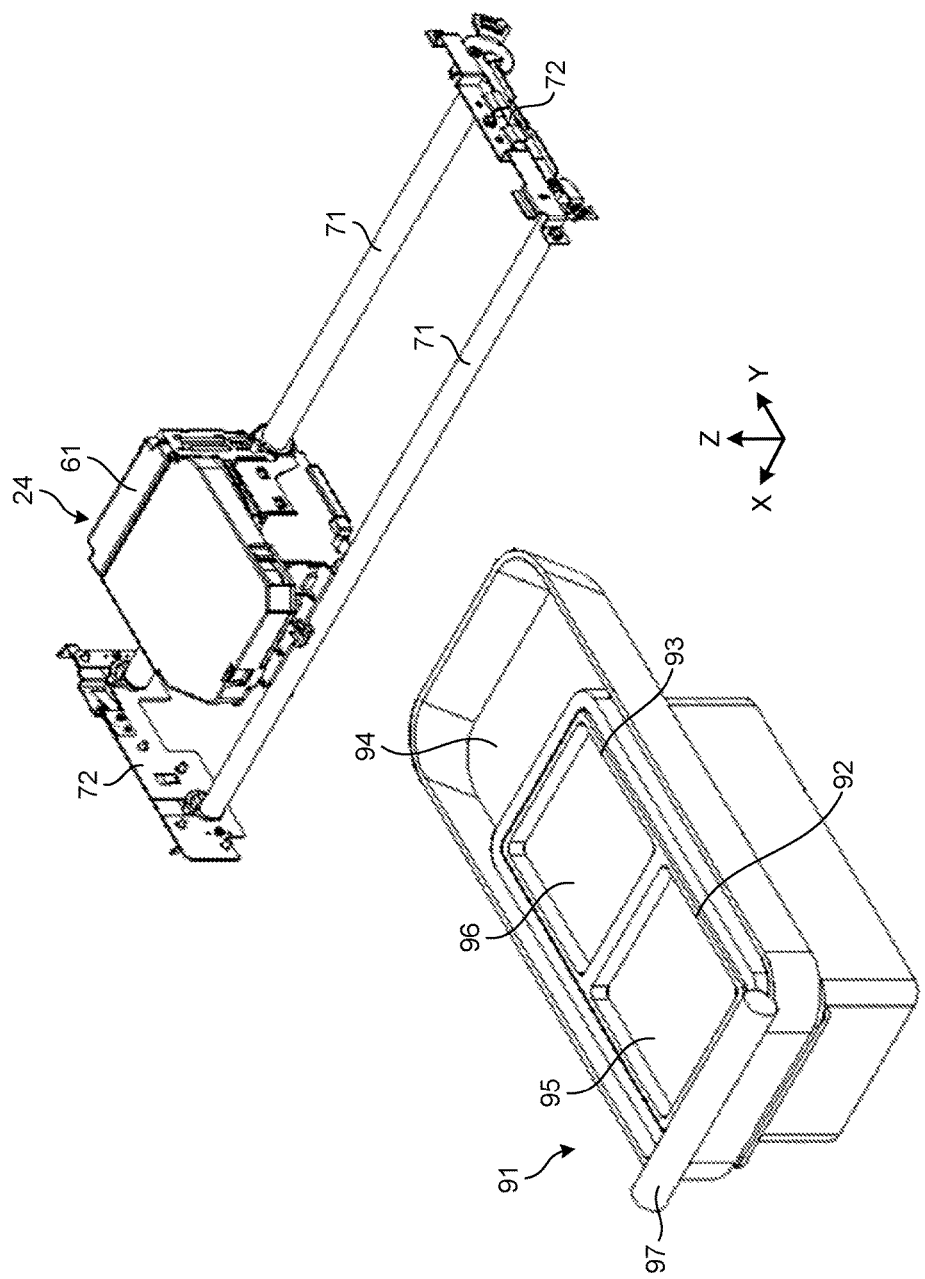
FIG. 12 is a perspective view illustrating an exemplary part of a hardware configuration of an object fabrication apparatus according to a second example of the embodiment.

FIG. 12 is a perspective view illustrating an exemplary part of a hardware configuration of the object fabrication apparatus 11 according to a second example of the embodiment. The second example illustrated in FIG. 12 and the first example illustrated in FIG. 2 to FIG. 5 are different in the mechanism of supplying the powder 27 to the fabrication vessels 31 and 93. The configuration according to the second example includes a storing and supplying unit 91.

The storing and supplying unit 91 includes a supplying vessel 92, a fabrication vessel 93, an excess receiving vessel 94, a supplying stage 95, a fabrication stage 96, and a roller 97.

The supplying vessel 92 is a member that stores therein the powder 27 to be conveyed to the fabrication vessel 93.

The fabrication vessel 93 is a member that stores therein the powder 27 conveyed from the supplying vessel 92. A three-dimensional object is formed in the fabrication vessel 93.

The excess receiving vessel 94 is a member that receives excess powder 27 overflowed the supplying vessel 92 and the fabrication vessel 93.

The supplying stage 95 is placed on the bottom of the supplying vessel 92 and displaces in a direction parallel to the Z direction. The supplying stage 95 moves up when the powder 27 is supplied, so as to push the powder 27 above the upper end of the supplying vessel 92.

The fabrication stage 96 is placed on the bottom of the fabrication vessel 93 and displaces in a direction parallel to the Z direction. The fabrication stage 96 moves down when the powder 27 is supplied, so that the fabrication vessel 93 can receive the powder 27 conveyed from the supplying vessel 92.

The roller 97 is a member that reciprocates along the Y direction while rotating. The roller 97 moves in the Y direction when the powder 27 is supplied, so as to convey the powder 27 raised above the supplying vessel 92 to the fabrication vessel 93. At this time, the roller 97 rotates and flattens the surface of the powder 27 in the fabrication vessel 93.

The amount of the powder 27 supplied to the fabrication vessel 93 can be adjusted by the amount of upward movement of the supplying stage 95, the amount of downward movement of the fabrication stage 96, and other factors. The total amount of the powder 27 supplied to the fabrication vessel 93 can be adjusted by the amount of upward movement of the supplying stage 95, the amount of downward movement of the fabrication stage 96, the number of reciprocation cycles of the roller 97, and other factors.

A configuration such as the one described in the above second example can form a three-dimensional object in the same manner as in the above-described first example illustrated in FIG. 1 to FIG. 5.

Figure 13:
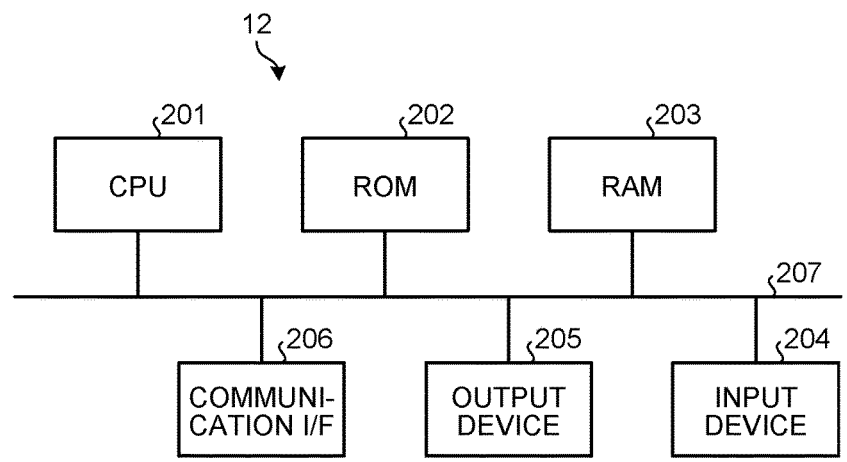
FIG. 13 is a diagram illustrating an exemplary hardware configuration of an information processing terminal according to the embodiment.

FIG. 13 is a diagram illustrating an exemplary hardware configuration of the information processing terminal 12 according to the embodiment. The information processing terminal 12 includes a CPU 201, a ROM 202, a RAM 203, an input device 204, an output device 205, a communication I/F 206, and a bus 207. The CPU 201 performs certain arithmetic processing according to a control program stored in the ROM 202 by using the RAM 203 as a working area. The input device 204 is a device for inputting information from the outside. Examples of the input device 204 include a keyboard, a mouse, and a touch panel. The output device 205 is a device for outputting internally generated information to the outside. Examples of the output device 205 include a display. The communication I/F 206 is a device that enables transmission and reception of signals between the information processing terminal 12 and an apparatus such as the object fabrication apparatus 11 via the network 13.

Figure 14:
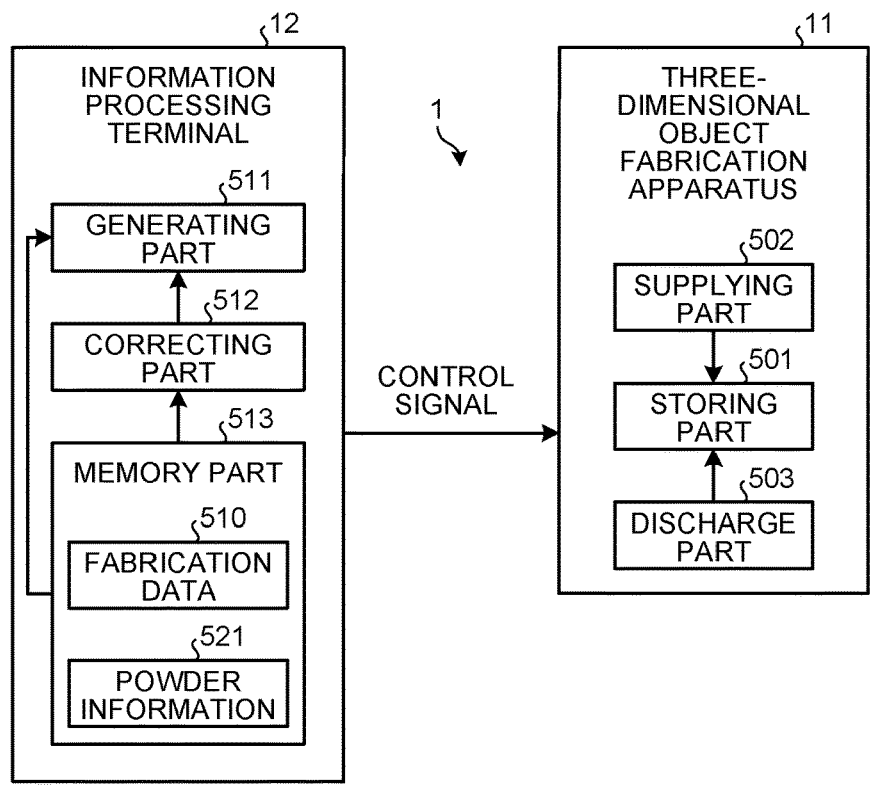
FIG. 14 is a diagram illustrating an exemplary functional configuration of the three-dimensional object fabrication system according to the embodiment.

FIG. 14 is a diagram illustrating an exemplary functional configuration of the three-dimensional object fabrication system 1 according to the embodiment. The object fabrication apparatus 11 includes a storing part 501, a supplying part 502, and a discharge part 503. The information processing terminal 12 includes a generating part 511, a correcting part 512, and a memory part 513.

The storing part 501 stores therein the powder 27 that has been supplied. A three-dimensional object is formed in the storing part 501. The storing part 501 can be implemented by a component such as the fabrication vessel 31 according to the first example illustrated in FIG. 2 to FIG. 5 and the fabrication vessel 93 according to the second example illustrated in FIG. 12. The storing part 501, however, is not limited thereto.

The supplying part 502 supplies the powder 27 to the storing part 501 according to a control signal from the information processing terminal 12. The supplying part 502 can be implemented by a component such as the supplying unit 22 according to the first example and the supplying vessel 92, the supplying stage 95, and the roller 97 according to the second example. The supplying part 502, however, is not limited thereto.

The discharge part 503 discharges the fabrication liquid 55 onto the powder 27 in the storing part 501 according to a control signal output from the information processing terminal 12. The discharge part 503 can be implemented by a component such as the fabrication liquid reservoir unit 23 and the discharge unit 24 according to the first example. The discharge part 503, however, is not limited thereto.

The generating part 511 generates a control signal for controlling the supplying part 502 and the discharge part 503. The control signal is generated on the basis of fabrication data 510 and powder information 521 stored in the memory part 513. The fabrication data 510 is information that indicates the shape of a desired three-dimensional object and contains a thickness in design of the three-dimensional object (the length in a laminating direction of the powder 27). The fabrication data 510 may be data for three-dimensional computer aided design system (3D-CAD) in the standard triangulated language (STL) format or the virtual reality modeling language (VRML) format, for example. The fabrication data 510 can be generated from, for example, a two-dimensional design drawing or three-dimensional scan data of the three-dimensional object. A method for acquiring the fabrication data 510 is not specifically limited. The fabrication data 510 can be acquired by an input operation by a user, an input from another device, reading from a storage medium, and other operations. The generating part 511 can be implemented by, for example, cooperation of components such as the CPU 201, a control program stored in the ROM 202, the RAM 203 serving as a working area, and an appropriate logic integrated circuit (IC). The generating part 511, however, is not limited thereto.

The correcting part 512 corrects the fabrication data 510 on the basis of the powder information 521 stored in the memory part 513. The powder information 521 is information that indicates a change in the thickness of the layer 35 of the powder 27 due to permeation of the fabrication liquid 55. A plurality of pieces of powder information 521 are preferably generated for respective types of powder 27. The correcting part 512 corrects the total amount of the powder 27 supplied from the supplying part 502 to the storing part 501 on the basis of the fabrication data 510 and the powder information 521 so as to compensate for an amount of reduction in the thickness of the layer 35 after the fabrication liquid 55 is discharged. The correcting part 512 corrects the fabrication data 510 on the basis of the powder information 521 so as to compensate for an amount of reduction in the thickness of the layer 35 after the fabrication liquid 55 is discharged. The correcting part 512 corrects the fabrication data 510 so as to, for example, increase the thickness in design of a desired three-dimensional object. The correcting part 512 can be implemented by, for example, cooperation of components such as the CPU 201, a control program stored in the ROM 202, the RAM 203 serving as a working area, and an appropriate logic IC. The correcting part 512, however, is not limited thereto.

The memory part 513 stores therein the fabrication data 510, the powder information 521, and other appropriate information. The memory part 513 can be implemented by a component such as the ROM 202 and the RAM 203 serving as a temporary storage area. The memory part 513, however, is not limited thereto. FIG. 14 illustrates that the powder information 521 is retained in the information processing terminal 12. The powder information 521, however, may be retained in a storage device outside the information processing terminal 12.

Control programs that implement respective functions of the generating part 511 and the correcting part 512 (including the functions of acquiring and generating the fabrication data 510) may be recorded and provided, as files in an installable or executable format, in a computer-readable recording medium such as a compact disc read only memory (CD-ROM), a flexible disk (FD), a compact disc recordable (CD-R), and a digital versatile disc (DVD).

The computer programs may be stored in a computer (server) connected to the network 13 such as the Internet and provided by being downloaded over the network 13. The control programs may be provided or distributed over the network 13. The control programs may be preinstalled and provided in the ROM 202 or other media.

A control program may have a modular configuration including the above-described functional parts (the generating part 511 and the correcting part 512). In this case, the CPU 201 reads the control program from the ROM 202 and executes the control program, thereby generating the functional parts on the RAM 203.

Figure 15:
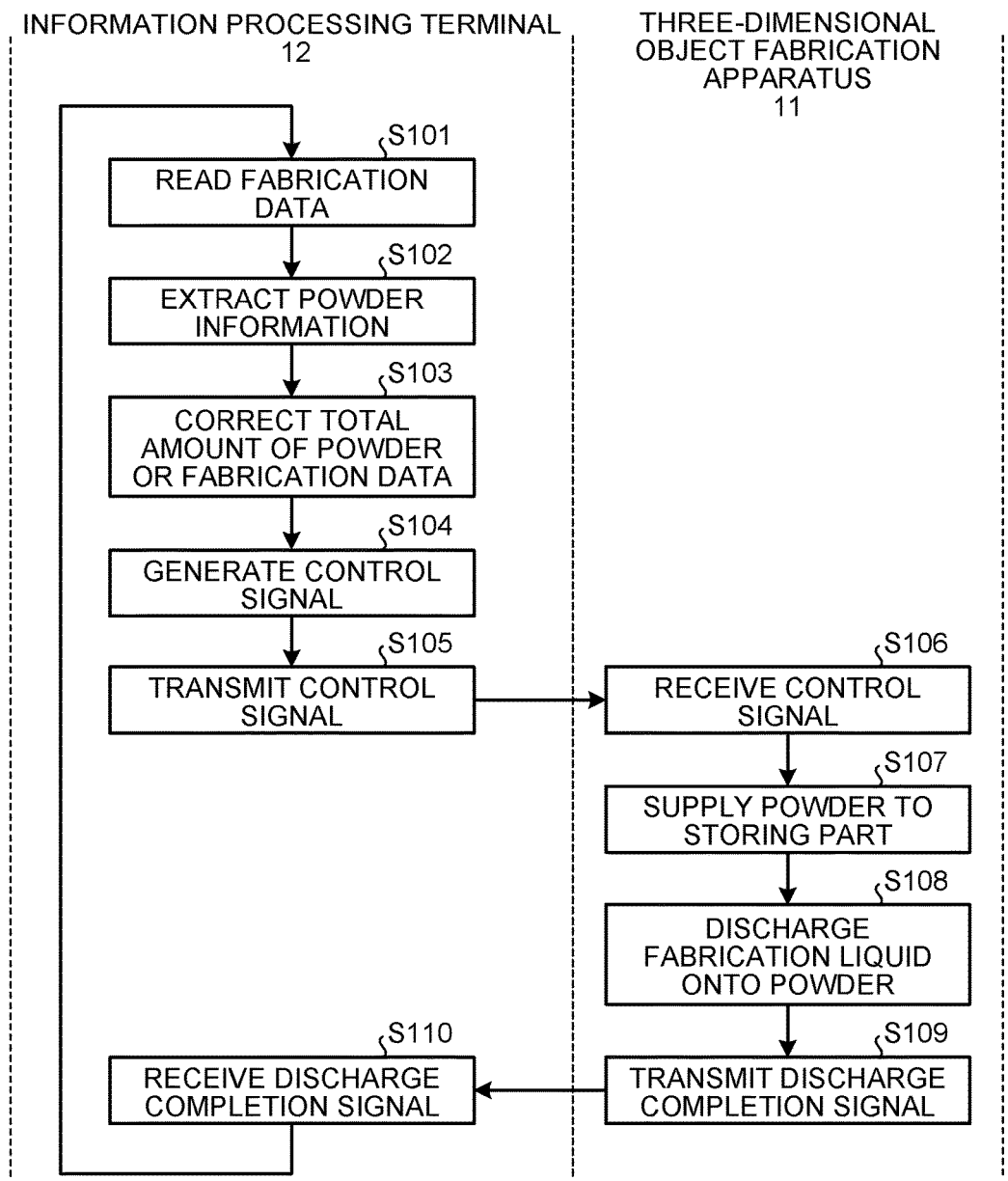
FIG. 15 is a flowchart illustrating exemplary processes of the three-dimensional object fabrication system according to the embodiment.

FIG. 15 is a flowchart illustrating exemplary processes of the three-dimensional object fabrication system 1 according to the embodiment. The information processing terminal 12 reads the fabrication data 510 of a desired three-dimensional object (S101), and extracts the powder information 521 corresponding to the powder 27 to be used (S102). The information processing terminal 12 corrects the total amount of the powder 27 supplied to the storing part 501 or the fabrication data 510 on the basis of the powder information 521 so as to compensate for an amount of reduction of the layer 35 after the fabrication liquid 55 is discharged (S103).

On the basis of the result of the correction at Step S103, the information processing terminal 12 generates a control signal for controlling the supplying part 502 and the discharge part 503 (S104), and transmits the control signal to the object fabrication apparatus 11 (S105).

The object fabrication apparatus 11 receives the control signal (S106). On the basis of the control signal, the object fabrication apparatus 11 supplies the powder 27 to the storing part 501 (S107), and discharges the fabrication liquid 55 onto the powder 27 in the storing part 501 (S108). The object fabrication apparatus 11 then transmits a discharge completion signal that indicates completion of discharge of the fabrication liquid 55 (S109).

The information processing terminal 12 receives the discharge completion signal (S110), and reads the fabrication data 510 again (S101).

Figure 16:
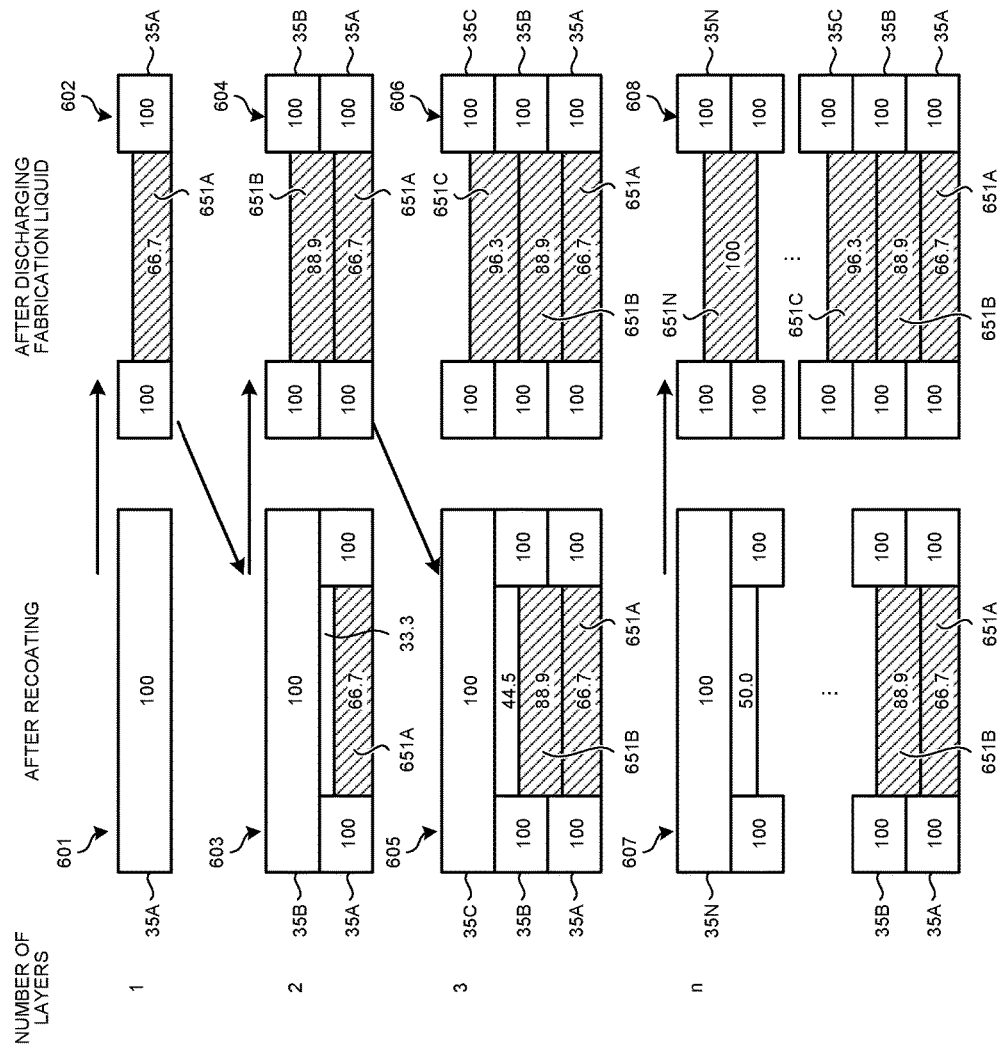
FIG. 16 is a diagram illustrating exemplary states in which powder is supplied to a storing part according to the embodiment.

FIG. 16 is a diagram illustrating exemplary states in which the powder 27 is supplied to the storing part 501 according to the embodiment. A first state 601 indicates that the thickness of a first layer 35A is 100 µm. In this example, the design value of the thickness of a layer to be added at recoating is set to 100 µm.

A second state 602 is a state in which the fabrication liquid 55 has been discharged onto the first layer 35A. The thickness has been reduced at a first permeated portion 651A where the fabrication liquid 55 has permeated the first layer 35A. In this example, the thickness of 100 µm has been reduced to 66.7 µm.

A third state 603 is a state in which a second layer 35B has been recoated on the layer 35A of the second state 602. At the recoating, a reduction in the thickness of the first permeated portion 651A, which is 33.3 µm, is compensated for to cause the total thickness of the first layer 35A and the second layer 35B to be 200 µm.

A fourth state 604 is a state in which the fabrication liquid 55 has been discharged onto the second layer 35B. The thickness has been reduced at a second permeated portion 651B where the fabrication liquid 55 has permeated the second layer 35B. In this example, a thickness of 133.3 µm has been reduced to 88.9 µm.

A fifth state 605 is a state in which a third layer 35C has been recoated on the layer 35B of the fourth state 604. At the recoating, a total reduction in the thickness of the first permeated portion 651A and the second permeated portion 651B, which is 44.5 µm, is compensated for to cause the total thickness of the first layer 35A, the second layer 35B, and the third layer 35C to be 300 µm.

A sixth state 606 is a state in which the fabrication liquid 55 has been discharged onto the third layer 35C. The thickness has been reduced at a third permeated portion 651C where the fabrication liquid 55 has permeated the third layer 35C. In this example, a thickness of 144.5 µm has been reduced to 96.3 µm.

A seventh state 607 is a state in which an nth layer 35N has been recoated. At the recoating, a total reduction in the thickness of the first permeated portion 651A, the second permeated portion 651B, . . . , and an (n−1)th permeated portion, which is 50 µm, is compensated for to cause the total thickness of the first layer 35A to the nth layer 35N to be (100×n) µm.

An eighth state 608 is a state in which the fabrication liquid 55 has been discharged onto the nth layer 35N. The thickness has been reduced at an nth permeated portion 651N where the fabrication liquid 55 has permeated the nth layer 35N. In this example, a thickness of 150 µm has been reduced to 100 µm.

As described above, a plurality of laminated permeated portions 651A to 651N have thicknesses (66.7 µm, 88.9 µm, 96.3 µm, . . . , 100 µm) that increase as the height of the layer increases, and the thicknesses of the permeated portions are asymptotic to the design value 100 µm of the thickness of a layer to be added at recoating.

Figure 17:
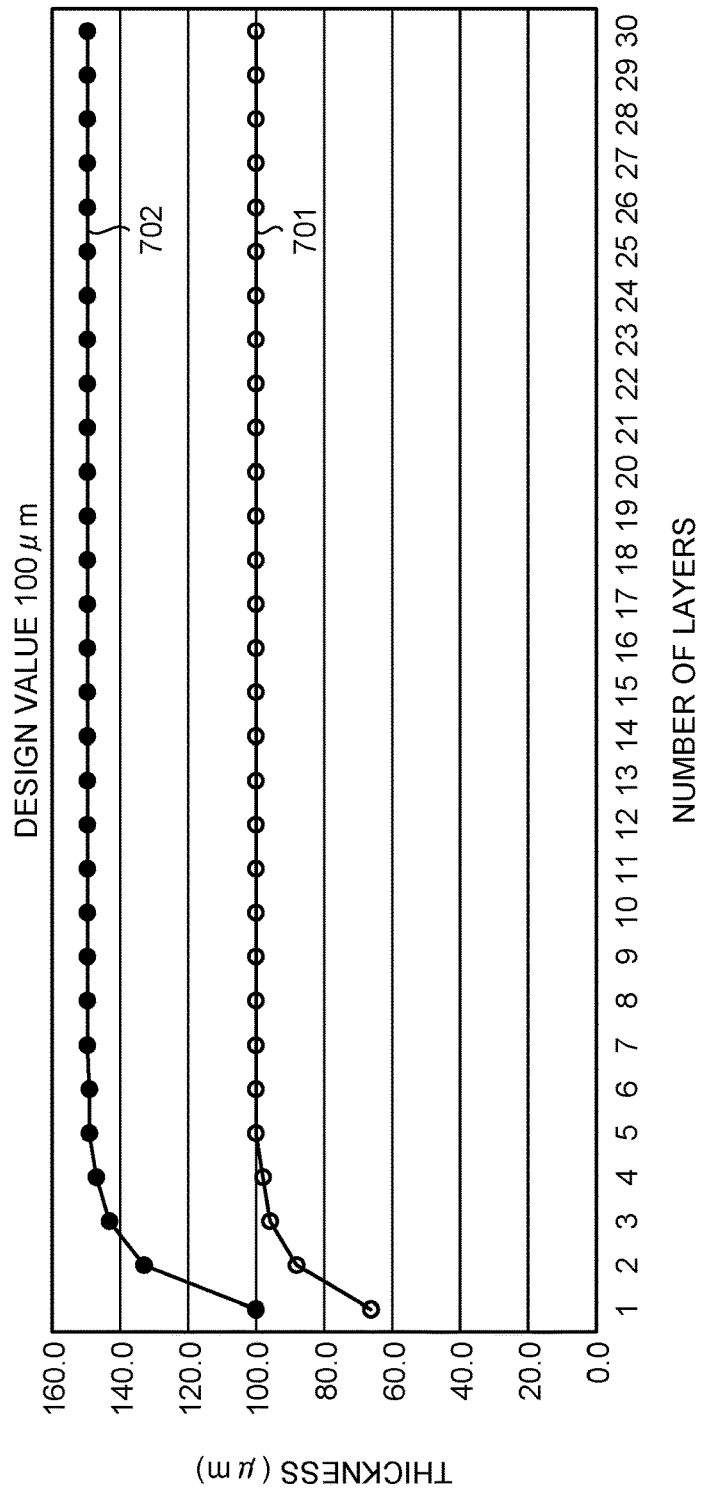
FIG. 17 is a graph illustrating an exemplary relation between the number of layers and the thicknesses of permeated portions, and an exemplary relation between the number of layers and the thicknesses of layers that are actually added at recoating, when stainless steel is used as the powder.

FIG. 17 is a graph illustrating an exemplary relation between the number of layers and the thicknesses of the permeated portions 651A to 651N, and an exemplary relation between the number of layers and the thicknesses of the layers 35A to 35N that are actually added at recoating, when stainless steel is used as the powder 27. A first asymptote 701 indicates the relation between the number of layers and the thicknesses of the permeated portions 651A to 651N. A second asymptote 702 indicates the relation between the number of layers and the thicknesses of the layers 35A to 35N that are actually added at recoating.

As indicated by the first asymptote 701, the thicknesses of the permeated portions 651A to 651N are asymptotic to the design value 100 µm of the thickness of a layer to be added at recoating along with an increase in the number of layers. In this example, the thickness of corresponding one of the permeated portions 651A to 651N reaches substantially 100 µm when the number of layers reaches 5. The thickness hardly changes thereafter. Consequently, as indicated by the second asymptote 702, the thickness of corresponding one of the layers 35A to 35N that is actually added at recoating reaches substantially 150 µm when the number of layers reaches 5. The thickness hardly changes thereafter. These results indicate that the effect of reduction in the powder 27 plateaus at and after the fifth layer.

The degree of reduction of the permeated portions 651A to 651N is determined by powder density $\rho_r$ at recoating (porosity $\varepsilon_r=1-\rho_r$) and powder density $\rho_i$ after discharge of a fabrication liquid (porosity $\varepsilon_i=1-\rho_i$). When stainless steel is used as the powder 27, $\rho_r$ is 40% ($\varepsilon_r=60\%$) and $\rho_i$ is 60% ($\varepsilon_i=40\%$). When such an increase in the density of the powder 27 due to permeation of the fabrication liquid 55 appears as a change in the thickness direction of the layers 35A to 35N (actually, the change in the thickness direction is predominant due to the effect of gravity), the thickness 100 µm decreases to substantially 66.7 µm as indicated by the second state 602, for example. In the same way, the thickness 133.3 µm decreases to substantially 88.9 µm as indicated by the fourth state 604. When a certain number of layers (5 in this example) is reached, the thickness of the permeated portion 35N is substantially equal to the design value 100 µm of a thickness to be added at recoating.

A reduction ratio k of the layers 35A to 35N can be defined by $k=t_i/t$ where t (100 µm) is a thickness in design (thickness in design of one layer) of each of the layers 35A to 35N and $t_i$ is a thickness (actual thickness of one layer) of each of the layers 35A to 35N after discharge of a fabrication liquid (the permeated portions 651A to 651N). In order to satisfy $t_i=t$, a thickness of $t/k=t^2/t_i$ needs to be formed after recoating (before discharge of the fabrication liquid) ($k(t^2/t_i)=t$).

A thickness (actual thickness of one layer) $t_n$ of the nth layer among the layers 35A to 35N after discharge of the fabrication liquid (permeated portions 651A to 651N) is represented by the following formula 1:

$$t_n = k\left(nt - \sum_{j=1}^{n-1} t_j\right) \quad (1)$$

where n is an integer of 1, 2, 3, . . . , m, and m is the total number of laminates (layers).

A total thickness $t_r$ of all layers (the actual thickness of an entire three-dimensional object) formed by discharging the fabrication liquid 55 onto each of the layers 35A to 35N is represented by the following formula 2:

$$t_r = \left(\frac{m(m+1)}{2}t - \sum_{n=1}^{m}(m-n)t_n\right)k \quad (2)$$

Thus, the amount of reduction in the thickness of the entire three-dimensional object formed by lamination (amount of overall reduction) is a difference between m×t and $t_r$. Adding the amount of overall reduction to the thickness in design of the entire three-dimensional object can compensate for the reduction of the powder 27 due to permeation of the fabrication liquid 55. A method for calculating the amount of overall reduction is not specifically limited. For example, the amount of overall reduction may be distributed evenly (by dividing the amount by the total number of layers) and added to the design values of layer thicknesses of the three-dimensional object. Alternatively, the amount of overall reduction may be distributed and added to the design values of layer thicknesses of the three-dimensional object so as to compensate for different amounts of reduction of the layers.

FIG. 18 is a diagram illustrating exemplary powder information 521A when stainless steel is used as the powder 27. m indicates the total number of laminates, which is 10 layers in this example. t indicates the design value of thickness of one layer (one-layer thickness) to be added at recoating, which is 100 µm in this example. A design thickness mt indicates the design thickness of an entire three-dimensional object that is desired, which is 10×100=1000 µm in this example. $t_i$ indicates a thickness (actual thickness) after the fabrication liquid 55 is discharged onto a layer having a thickness of t, which is 66.6 µm in this example. k is a reduction ratio of a layer due to permeation of the fabrication liquid, which is $t_i/t=0.666$. n indicates the number of layers. $t_n$ is an approximate value of each thickness of the permeated portions 651A to 651N in the respective layers. $t_r$ is a value that indicates the actual thickness of the entire three-dimensional object, which is calculated by formula 2. The second term of $t_r$ indicates a value of the second term of formula 2 for each layer. The first term of $t_r$ indicates a value of the first term of formula 2, which is 5500 in this example. The sum of the second term of $t_r$ indicates a sum value of the second term of formula 2, which is 4074 in this example.

In FIG. 18, the difference from the design thickness indicates a difference between the design thickness (the thickness in design of an entire three-dimensional object) mt, which is 1000 µm, and the actual thickness $t_r$ of the entire three-dimensional object, which is 950 µm. This difference is 50 µm in this example. It is preferable that the fabrication data 510 be corrected for the addition of the difference 50 µm to the design thickness 1000 µm. In order to compensate for the difference 50 µm, the total amount of the powder 27 is controlled when supplied from the supplying part 502 to the storing part 501. A method for controlling the total amount of the powder 27 is not specifically limited. For example, in the configurations according to the first example illustrated in FIG. 2 to FIG. 11, the controller 100 may control the operations of the carriage 61 and the supplying unit 22 to increase or decrease the number of supply cycles of the powder 27 so that the difference 50 µm is compensated for. This control causes the final thickness of the entire three-dimensional object, to be the design thickness mt of 1000 µm.

Figure 19:
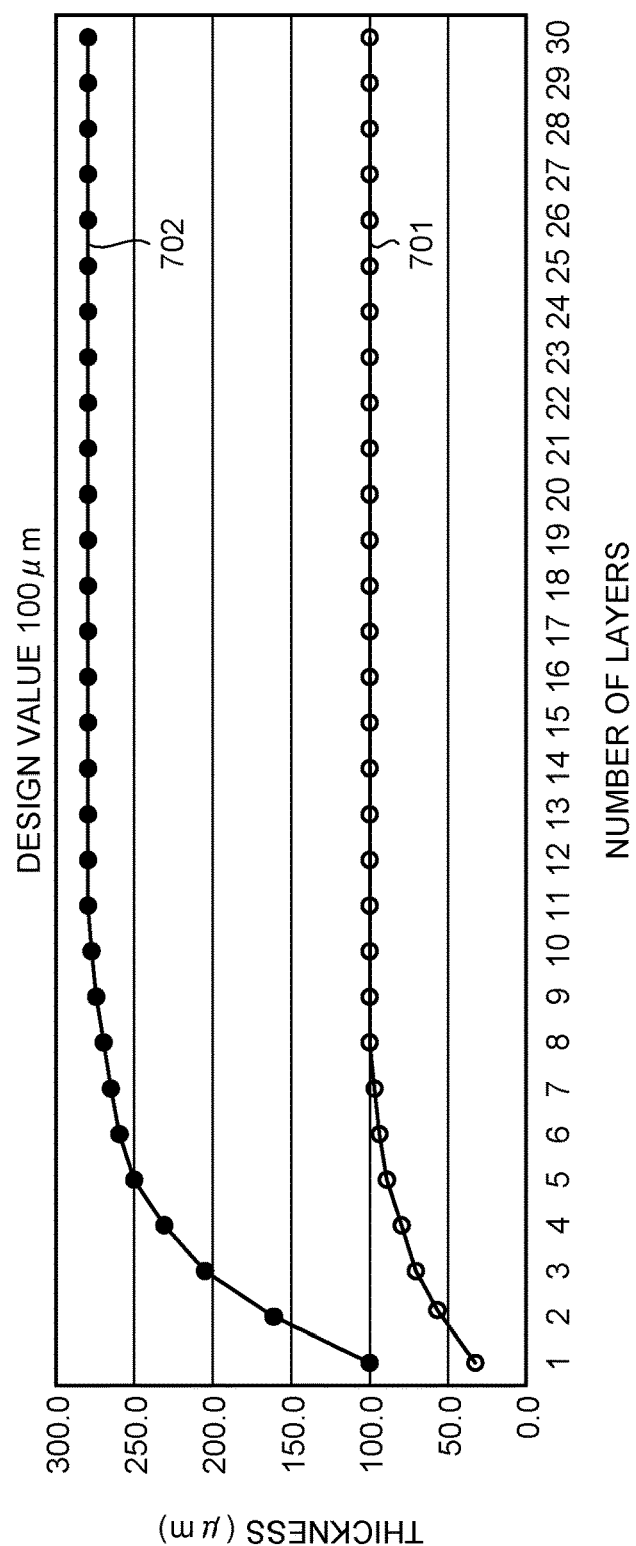
FIG. 19 is a graph illustrating an exemplary relation between the number of layers and the thicknesses of permeated portions and an exemplary relation between the number of layers and the thicknesses of layers that are actually added at recoating, when zirconia is used as the powder.

FIG. 19 is a graph illustrating an exemplary relation between the number of layers and the thicknesses of the permeated portions 651A to 651N, and an exemplary relation between the number of layers and the thicknesses of the layers 35A to 35N that are actually added at recoating, when zirconia is used as the powder 27. FIG. 20 is a diagram illustrating exemplary powder information 521B when zirconia is used as the powder 27. In this example, the fabrication data 510 is corrected for the addition of the difference 180 µm to the design thickness mt of 1500 µm.

In this example of zirconia, similarly to the example of stainless steel illustrated in FIG. 17, the thicknesses of the permeated portions 651A to 651N are asymptotic to the design value 100 µm of the thickness of a layer to be added at recoating along with an increase in the number of layers. In this example of zirconia, however, as illustrated in FIG. 19 and FIG. 20, corresponding one of the thicknesses of the permeated portions 651A to 651N reaches substantially 100 µm when the number of layers reaches 12. This result indicates that the effect of reduction in the powder 27 plateaus at and after the twelfth layer when zirconia is used.

As describe above, the characteristics of an asymptote change depending on the type of the powder 27, and thus the effect of reduction in the powder 27 changes. This means that appropriate correction can be performed by providing a plurality of pieces of powder information 521 for respective types of powder 27 and using an appropriate piece of powder information 521 for the powder 27 to be used.

The powder information 521A and 521B illustrated in FIG. 18 and FIG. 20, respectively, are examples. The powder information 521 is not limited thereto. For example, the powder information 521 may be generated for each combination of powder 27 and a fabrication liquid 55. This generation is effective when a plurality of fabrication liquids 55 are used for one powder 27. The powder information 521 may also be generated in relation to environmental information such as temperature and humidity. This generation is effective when the reduction ratio k (density) of the powder 27 changes largely depending on the environment.

As described above, the embodiment enables prevention of a problem caused by a reduction of the layer 35 due to permeation of the fabrication liquid 55, thereby improving the precision of fabrication a three-dimensional object.

The above-described embodiment is illustrative and does not limit the present invention. Thus, numerous additional modifications and variations are possible in light of the above teachings. For example, at least one element of different illustrative and exemplary embodiment herein may be combined with each other or substituted for each other within the scope of this disclosure and appended claims. Further, features of components of the embodiment, such as the number, the position, and the shape are not limited the embodiment and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiment may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A control method for controlling a three-dimensional object fabrication apparatus, the object fabrication apparatus including a storing unit configured to store powder; a supplying unit configured to supply the powder to the storing unit, in layer; and a discharge unit configured to discharge, onto the powder, a fabrication liquid for solidifying the powder, the control method comprising:

controlling a total amount of the powder to be supplied from the supplying unit to the storing unit, to compensate for an amount of reduction in thickness of the layer after discharge of the fabrication liquid, based on fabrication data, indicating a shape of a three-dimensional object, and powder information, indicating a change in dimension of a layer of the powder due to permeation of the fabrication liquid, the controlling of the total amount of the powder to compensate for an amount of reduction in thickness of the layer after discharge of the fabrication liquid, including calculating, based on the powder information, an actual thickness of the three-dimensional object, after reduction due to permeation of the fabrication liquid, and adding a difference, between the thickness in design of the three-dimensional object and the actual thickness of the three-dimensional object, to the thickness in design of the three-dimensional object.

2. The control method of claim 1, wherein the powder information contains information indicating an amount of reduction for each of the layers of the three-dimensional object, the method further comprising:

correcting the thickness in design for each of the layers of a total number of the layers so as to compensate for the amount of reduction caused in each of the layers.

3. The control method of claim 1, wherein, the adding of the difference includes adding a value, obtained by dividing an amount of overall reduction by a total number of the layers, to a thickness in design for each of the layers of the total number of the layers, the amount of overall reduction being an amount of reduction in thickness of an entirety of the three-dimensional object.

4. The control method of claim 1, further comprising:
extracting the powder information, corresponding to powder being used, from a memory storing a plurality of pieces of the powder information, respective types of the powder; and
correcting the fabrication data based on the powder information extracted.

5. The control method of claim 1, further comprising:
calculating the actual thickness of the three-dimensional object by
calculating an actual thickness $t_n$ of an nth layer by formula 1, and calculating an actual thickness $t_r$ of an entirety of the three-dimensional object by formula 2:

$$t_n = k\left(nt - \sum_{j=1}^{n-1} t_j\right) \quad (1)$$

$$t_r = \left(\frac{m(m+1)}{2}t - \sum_{n=1}^{m}(m-n)t_n\right)k \quad (2)$$

where m is a total number of layers, t is a thickness in design of one layer in the three-dimensional object, n is a positive integer equal to or larger than 1 and equal to or smaller than m, and k is {(a thickness of the one layer after a fabrication liquid is discharged)/t}.

6. The control method of claim 1, wherein, the adding of the difference includes adding a value to a thickness in design for a total number of the layers, an amount of overall reduction being an amount of reduction in thickness of an entirety of the three-dimensional object.

7. A control apparatus for a three-dimensional object fabrication apparatus, the three-dimensional object fabrication apparatus including a storing unit configured to store powder; a supplying unit configured to supply the powder to the storing unit, in layers; and a discharge unit configured to discharge, onto the powder, a fabrication liquid for solidifying the powder, the control apparatus comprising:
a controller configured to control a total amount of the powder to be supplied from the supplying unit to the storing unit based on fabrication data, indicating a shape of a three-dimensional object and including a thickness in design of the three-dimensional object, and powder information, indicating a change in dimension of a layer of the powder due to permeation of the fabrication liquid, wherein to control the total amount of the powder to be supplied to correct the fabrication data based on the powder information so as to compensate for an amount of reduction in thickness of the layer after discharge of the fabrication liquid, the controller is configured to
calculate, based on the powder information, an actual thickness of the three-dimensional object, after reduction due to permeation of the fabrication liquid, and
add a difference, between the thickness in design of the three-dimensional object and the actual thickness of the three-dimensional object, to the thickness in design of the three-dimensional object.

8. The control apparatus for the three-dimensional object fabrication apparatus of claim 7, wherein
the powder information contains information indicating the amount of reduction for each of the layers, and
the controller is configured to correct the thickness in design for each of the layers of a total number of the layers so as to compensate for the amount of reduction caused in each of the layers.

9. The control apparatus for the three-dimensional object fabrication apparatus of claim 7, wherein the controller, to add the difference, is configured to add a value, obtained by dividing an amount of overall reduction by a total number of the layers, to a thickness in design for each of the layers of the total number of the layers, the amount of overall reduction being an amount of reduction in thickness of an entirety of the three-dimensional object.

10. The control apparatus for the three-dimensional object fabrication apparatus of claim 7, wherein the controller is configured to extract the powder information, corresponding to powder being used, from a memory storing a plurality of pieces of the powder information, for respective types of the powder, and is configured to correct the fabrication data based on the powder information extracted.

11. The control apparatus for the three-dimensional object fabrication apparatus of claim 7, wherein the controller is configured to calculate the actual thickness of the three-dimensional object by being configured to
calculate an actual thickness $t_n$ of an nth layer by formula 1, and calculate an actual thickness $t_r$ of an entirety of the three-dimensional object by formula 2:

$$t_n = k\left(nt - \sum_{j=1}^{n-1} t_j\right) \quad (1)$$

$$t_r = \left(\frac{m(m+1)}{2}t - \sum_{n=1}^{m}(m-n)t_n\right)k \quad (2)$$

where m is a total number of layers, t is a thickness in design of one layer in the three-dimensional object, n is a positive integer equal to or larger than 1 and equal to or smaller than m, and k is {(a thickness of the one layer after a fabrication liquid is discharged)/t}.

12. The control apparatus for the three-dimensional object fabrication apparatus of claim 7, wherein the controller, to add the difference, is configured to add a value to a thickness in design for a total number of the layers, an amount of overall reduction being an amount of reduction in thickness of an entirety of the three-dimensional object.

13. A three-dimensional object fabrication system comprising:
a storing unit configured to store powder;
a supplying unit configured to supply the powder to the storing unit, in layers;
a discharge unit configured to discharge, onto the powder, a fabrication liquid for solidifying the powder; and
a controller configured to control a total amount of the powder to be supplied from the supplying unit to the storing unit based on fabrication data, indicating a shape of a three-dimensional object and including a thickness in design of the three-dimensional object, and powder information, indicating a change in dimension of a layer of the powder due to permeation of the fabrication liquid, wherein to control the total amount of the powder to be supplied to correct the fabrication data based on the powder information so as to compensate for an amount of reduction in thickness of the layer after discharge of the fabrication liquid, the controller is configured to
- calculate, based on the powder information, an actual thickness of the three-dimensional object, after reduction due to permeation of the fabrication liquid, and
- add a difference, between the thickness in design of the three-dimensional object and the actual thickness of the three-dimensional object, to the thickness in design of the three-dimensional object.

14. The three-dimensional object fabrication system of claim 13, wherein the powder information contains information indicating an amount of reduction for each of the layers of the three-dimensional object, and wherein
the controller is configured to correct the thickness in design for each of the layers of a total number of the layers so as to compensate for the amount of reduction caused in each of the layers.

15. The three-dimensional object fabrication system of claim 13, wherein the controller, to add the difference, is configured to add a value, obtained by dividing an amount of overall reduction by a total number of the layers, to a thickness in design for each of the layers of the total number of the layers, the amount of overall reduction being an amount of reduction in thickness of an entirety of the three-dimensional object.

16. The three-dimensional object fabrication system of claim 13, wherein the controller is configured to extract the powder information, corresponding to powder being used, from a memory storing a plurality of pieces of the powder information, for respective types of the powder, and is configured to correct the fabrication data based on the powder information extracted.

17. The three-dimensional object fabrication system of claim 13, wherein the controller is configured to calculate the actual thickness of the three-dimensional object by being configured to
calculate an actual thickness $t_n$ of an nth layer by formula 1, and calculate an actual thickness $t_r$ of an entirety of the three-dimensional object by formula 2:

$$t_n = k\left(nt - \sum_{j=1}^{n-1} t_j\right) \quad (1)$$

$$t_r = \left(\frac{m(m+1)}{2}t - \sum_{n=1}^{m}(m-n)t_n\right)k \quad (2)$$

where m is a total number of layers, t is a thickness in design of one layer in the three-dimensional object, n is a positive integer equal to or larger than 1 and equal to or smaller than m, and k is {(a thickness of the one layer after a fabrication liquid is discharged)/t}.

18. The three-dimensional object fabrication system of claim 13, wherein the controller, to add the difference, is configured to add a value to a thickness in design for a total number of the layers, an amount of overall reduction being an amount of reduction in thickness of an entirety of the three-dimensional object.

* * * * *